US010445690B2

(12) United States Patent
Pellow et al.

(10) Patent No.: US 10,445,690 B2
(45) Date of Patent: Oct. 15, 2019

(54) SYSTEM, METHOD, AND NON-TRANSITORY COMPUTER-READABLE STORAGE MEDIA RELATED TO RE-STOCKING MAPS

(71) Applicant: Wal-Mart Stores, Inc., Bentonville, AR (US)

(72) Inventors: Benjamin Pellow, Oakland, CA (US); Emily Poplawski, Palo Alto, CA (US); Stephen Aase, Boise, ID (US)

(73) Assignee: WALMART APOLLO, LLC, Bentonville, AR (US)

( * ) Notice: Subject to any disclaimer, the term of this patent is extended or adjusted under 35 U.S.C. 154(b) by 659 days.

(21) Appl. No.: 15/010,354

(22) Filed: Jan. 29, 2016

(65) Prior Publication Data

US 2017/0220983 A1    Aug. 3, 2017

(51) Int. Cl.
*G06Q 10/08* (2012.01)
*G06F 16/29* (2019.01)

(52) U.S. Cl.
CPC .......... *G06Q 10/087* (2013.01); *G06F 16/29* (2019.01)

(58) Field of Classification Search
None
See application file for complete search history.

(56) References Cited

U.S. PATENT DOCUMENTS

| 6,844,821 B2* | 1/2005 | Swartzel ............... G06Q 30/06 235/385 |
| 2006/0265294 A1 | 11/2006 | de Sylva |
| 2007/0281689 A1 | 12/2007 | Altman et al. |
| 2008/0228600 A1 | 9/2008 | Treyz et al. |
| 2008/0231431 A1 | 9/2008 | Stawar et al. |
| 2010/0218131 A1 | 8/2010 | Holm-Petersen et al. |
| 2014/0084060 A1* | 3/2014 | Jain ....................... G06Q 10/087 235/385 |
| 2014/0274107 A1 | 9/2014 | Rados |
| 2016/0189092 A1* | 6/2016 | George ................ G06Q 10/087 705/28 |

(Continued)

OTHER PUBLICATIONS

U.S. Appl. No. 15/010,394, filed Jan. 29, 2016 entitled "Database Mining Techniques for Generating Customer-Specific Maps in Retail Applications".

(Continued)

*Primary Examiner* — Nathan C Uber
*Assistant Examiner* — Denisse Y Ortiz Roman
(74) *Attorney, Agent, or Firm* — Bryan Cave Leighton Paisner LLP

(57) ABSTRACT

Techniques related to presentation of re-stocking maps are disclosed. The techniques involve accessing using a search engine module, from at least one database, map data relating to a layout of a retail facility, product data identifying products for sale at the retail facility, location data defining a location of products for sale at the retail facility, and inventory data providing an inventory level of the products for sale at the retail facility. A processor makes a determination about which products require re-stocking based on the inventory level. A map of the layout of the retail facility is then generated for presentation on a display of a computing device. The map indicates the location of the products requiring re-stocking with respect to the layout.

20 Claims, 7 Drawing Sheets

(56) References Cited

U.S. PATENT DOCUMENTS

2016/0203429 A1* 7/2016 Mellott ............ G06Q 10/06315
705/7.25
2017/0221119 A1 8/2017 Pellow et al.
2017/0221170 A1 8/2017 Pellow et al.

OTHER PUBLICATIONS

U.S. Appl. No. 15/010,449, filed Jan. 29, 2016 entitled "System, Method, and Non-Transitory Computer-Readable Storage Media Related to Concurrent Presentation of Retail Facility Maps".

* cited by examiner

SYSTEM, METHOD, AND NON-TRANSITORY COMPUTER-READABLE STORAGE MEDIA RELATED TO RE-STOCKING MAPS

FIELD OF THE DISCLOSURE

U.S. Patent Classification Primary Class: 707 (DATA PROCESSING: DATABASE, DATA MINING, AND FILE MANAGEMENT OR DATA STRUCTURES). Art Unit: 2161.

The disclosure is related to search engines, and more particularly, to systems, methods, and computer-readable storage media that perform a search request to mine various databases for retail applications.

BACKGROUND

Retailers commonly offer tens of thousands of products for sale to the consumers in stores. To offer such a substantial amount of products, retailers require stores of considerable size. To optimize sales, retailers push to keep products in stock by replenishing out-of-stock or limited stock products on store shelves. This way, consumers are able to purchase the product because the product is in stock.

Currently, keeping products in stock is a harrowing task considering the size of stores and the amount of products offered. Conventionally, a fleet of employees manually investigates the store by walking around the store and looking for empty or nearly empty shelves. Checking for stock levels in this manner typically happens only at periodic intervals due to the impracticality of having employees continuously investigating the store. For example, partial restocking efforts typically occur approximately every few hours during the day, with major restocking efforts typically occurring at night, when consumer traffic is lower.

Such conventional techniques are inefficient because the employees are spending a significant amount of time blindly investigating stock levels. As such, employees are prevented from performing other tasks in the store, such as operating checkout stations, or the like. Similarly, employees performing other tasks in the store, such as operating checkout stations, may be required to leave such tasks to perform the blind investigation of stock levels. In addition, because conventional restocking efforts are conducted only on a limited basis, products are more likely to be out-of-stock, thereby hurting sales.

The present invention is aimed at least one or more of the problems identified above.

SUMMARY

In one embodiment, a system is provided comprising at least one database. The at least one database comprises map data relating to a layout of a retail facility, product data identifying products for sale at the retail facility, location data defining a location of the products for sale at the retail facility, and inventory data providing an inventory level of the products for sale at the retail facility. The system comprises a processor that is configured to access, using a search engine module, the map data, product data, location data, and inventory data. The processor determines the products requiring re-stocking based on the inventory level. The processor generates for presentation on a display of a computing device a map of the layout of the retail facility. The map indicates with respect to the layout the location of the products requiring re-stocking.

In other embodiments, a computer-implemented method is provided. The computer-implemented method includes the step of accessing, with a search engine module, from at least one database map data relating to a layout of a retail facility, product data identifying products for sale at the retail facility, location data defining a location of the products for sale at the retail facility, and inventory data providing an inventory level of the products for sale at the retail facility. The computer-implemented method includes the step of determining, with the processor, the products requiring re-stocking based on the inventory level. The processor generates a map of the layout of the retail facility for presentation on a display of a computing device. The map indicates the location of the products requiring re-stocking with respect to the layout.

In still other embodiments, one or more non-transitory computer-readable storage media have computer-executable instructions embodied thereon. When executed by at least one processor, the computer-executable instructions cause the processor to accesses, from at least one database, map data relating to a layout of a retail facility, product data identifying products for sale at the retail facility, location data defining a location of products for sale at the retail facility, and inventory data providing an inventory level of the products for sale at the retail facility. The processor determines the products requiring re-stocking based on the inventory level. The processor generates a map of the layout of the retail facility for presentation on a display of a computing device. The map indicates the location of the products requiring re-stocking with respect to the layout.

The system, computer-implemented method, and non-transitory computer-readable storage media are configured to use data mining techniques to provide a map indicating the location of the products requiring re-stocking with respect to the layout of the retail store. This revolutionizes the daunting task of keeping products in stock, particularly considering the size of stores and the amount of products offered. The techniques described herein eliminate the need for having a fleet of employees manually investigate the store by walking around the store blindly looking for empty or nearly empty shelves. In addition, the system, computer-implemented method, and non-transitory computer-readable storage media allow stock levels to be checked and presented on the map in a real-time manner, thereby immediately addressing the re-stocking of products before the products are out-of-stock. The fill-rate of the store can be greatly improved by having employees re-stock specific products as soon as they are indicated on the map as being out-of-stock or limited stock, preventing the loss of sales that usually occur when products are not on shelves. This technique cuts re-stocking time per product and provides an effective solution for continuous re-stocking instead of conventional periodic restocking. By showing a re-stocking employee the exact location of out-of-stock products, and in some embodiments, a re-stocking priority order of the products based on economic factors, the techniques described herein optimize efficiency, effectiveness, and sales.

BRIEF DESCRIPTION OF THE FIGURES

Other advantages of the present disclosure will be readily appreciated, as the same becomes better understood by reference to the following detailed description when considered in connection with the accompanying drawings wherein.

Figure 1:
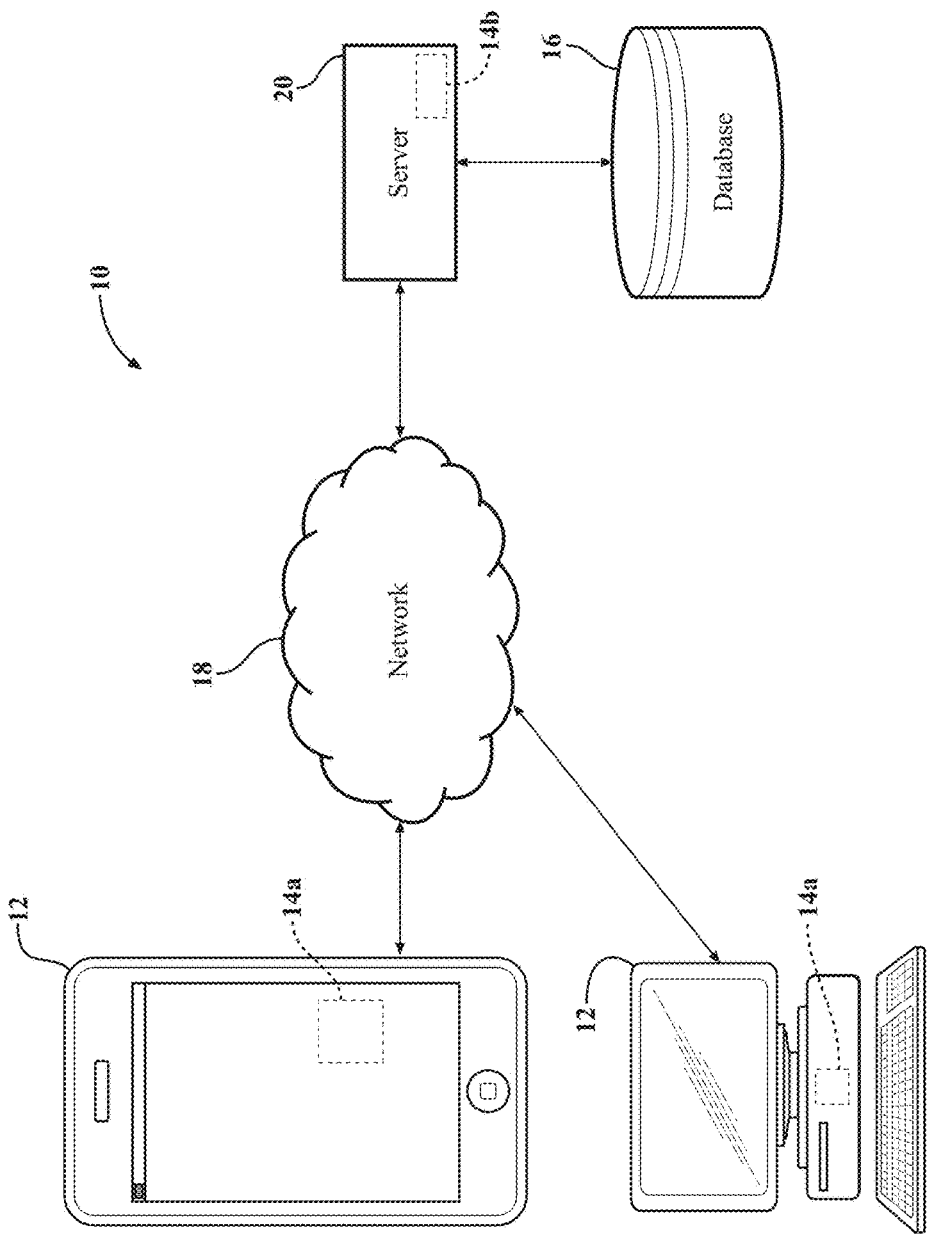
FIG. 1 is a schematic illustration of a system for providing presentation of a re-stocking map, according to one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

A. System and Method Overview

Referring to the Figures, wherein like parts or components are identified using like numerals throughout the several views, one example of a system 10 is provided in FIG. 1. The system 10 is utilized for aiding in the re-stocking of products offered for sale at a retail facility.

Other features of the system 10 can be found in commonly owned U.S. patent application Ser. No. 15/010,394, filed on Jan. 29, 2016 and commonly owned U.S. patent application Ser. No. 15/010,449, filed on Jan. 29, 2016, which are hereby incorporated by reference in their entirety.

As used herein, the term "retail facility" may refer to any store, business or a combination of businesses that sells and/or offers to sell products or services to a consumer. Examples of a retail store include grocery stores, malls, department stores, convenient stores, etc. The retail facility may be representative of a larger corporate environment, which may provide many avenues of interface with the consumer. A retailer operates the retail facility.

The system 10 includes a computing device 12, a processor 14, a search engine module 15, and at least one database 16. The computing device 12 is configured to access data from the database(s) 16 via a network 18 using, in one embodiment, the search engine module 15. In some embodiments, a server 20 may communicate with the computing device 12, and vice-versa.

The computing device 12 is operated or possessed by an individual. The individual is preferably any individual who performs re-stocking tasks at the retail facility. Re-stocking generally refers to the process of replenishing inventory of products offered for sale by the retail facility. The individual may be any individual capable of using the techniques described herein. For example, the individual may be any employee contractor, service provider, or the like.

The computing device 12 comprises, or is in communication with, a display 22. The display 22 allows the presentation of information to assist the individual in re-stocking products at the retail facility.

The processor 14 may be implemented by the computing device 12, the server 20, or both. When implemented by both, the computing device 12 may comprise at least one processor 14a, and the server 20 may implement at least another processor 14b, as shown in FIG. 1. Those skilled in the art appreciate that various other configurations are possible without departing from the scope of the invention.

Figure 2:
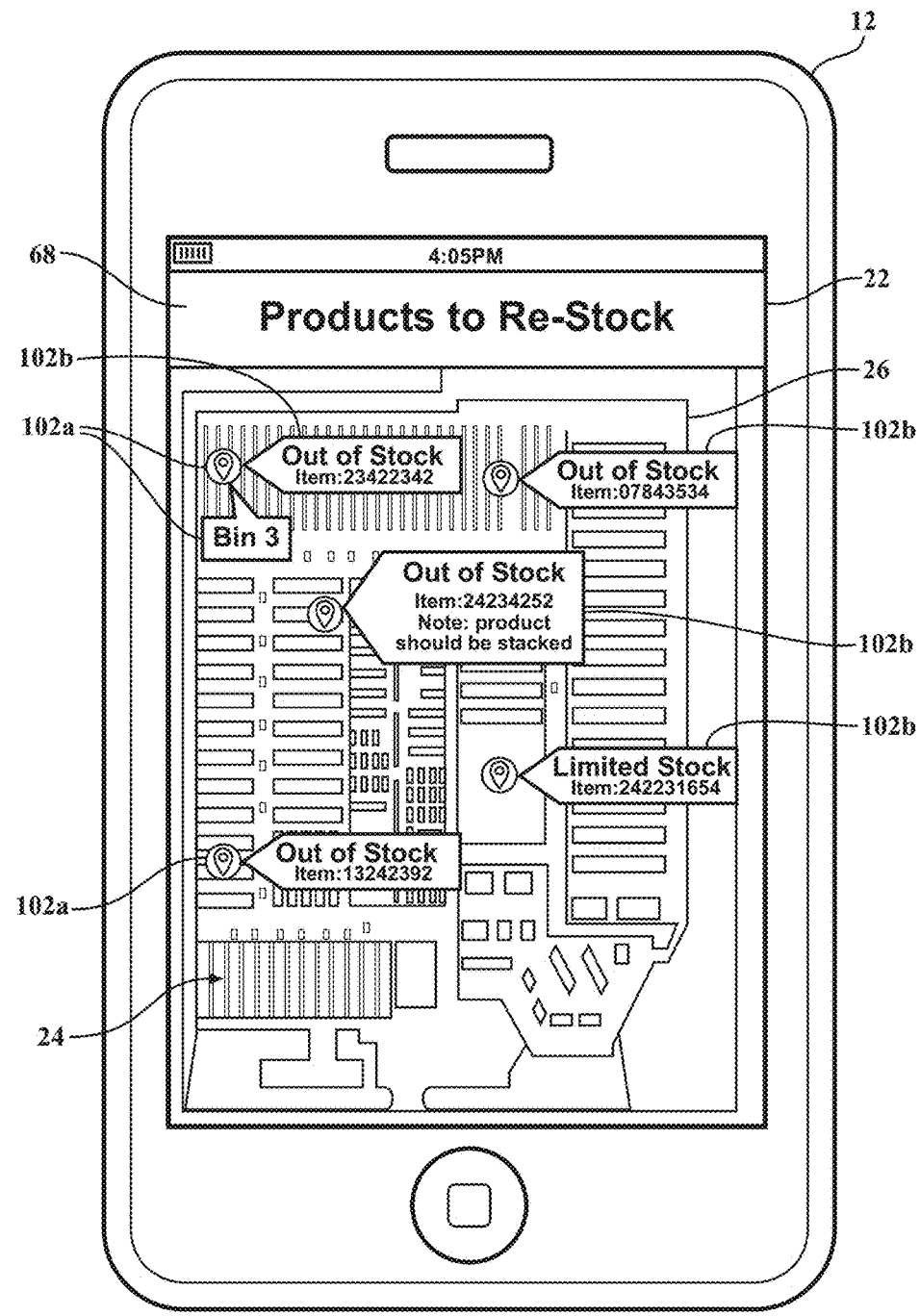
FIG. 2 is a sample screenshot of the display of a computing device presenting the re-stocking map having product location and inventory graphics overlaid thereon, according to an embodiment of the present invention.

As shown in FIG. 2, the retail facility comprises a layout 24, such a floor plan, defining, to approximate scale, the position and location of any suitable structures, areas, and objects at the facility. In FIG. 2, the layout 24 is presented in the form of a map 26 that is presented on the display 22 of the computing device 12. The map 26 provides, among other things, a digital representation of the layout 24 of the facility, in part, or in whole.

The layout 24 may define the position and location of aisles, departments, restrooms, exits, entrances, parking areas, restaurants, and the like. These structures, areas, and objects are defined within a perimeter of the layout 24, which represents the exterior wall of the facility. Typically, each retail facility comprises its own layout 24. In some instances, retail facilities may include common layouts 24. The layout 24 of the facility is stored in an electronic format and in mediums, such as the database(s) 16 for example, to facilitate the techniques herein.

Figure 3:
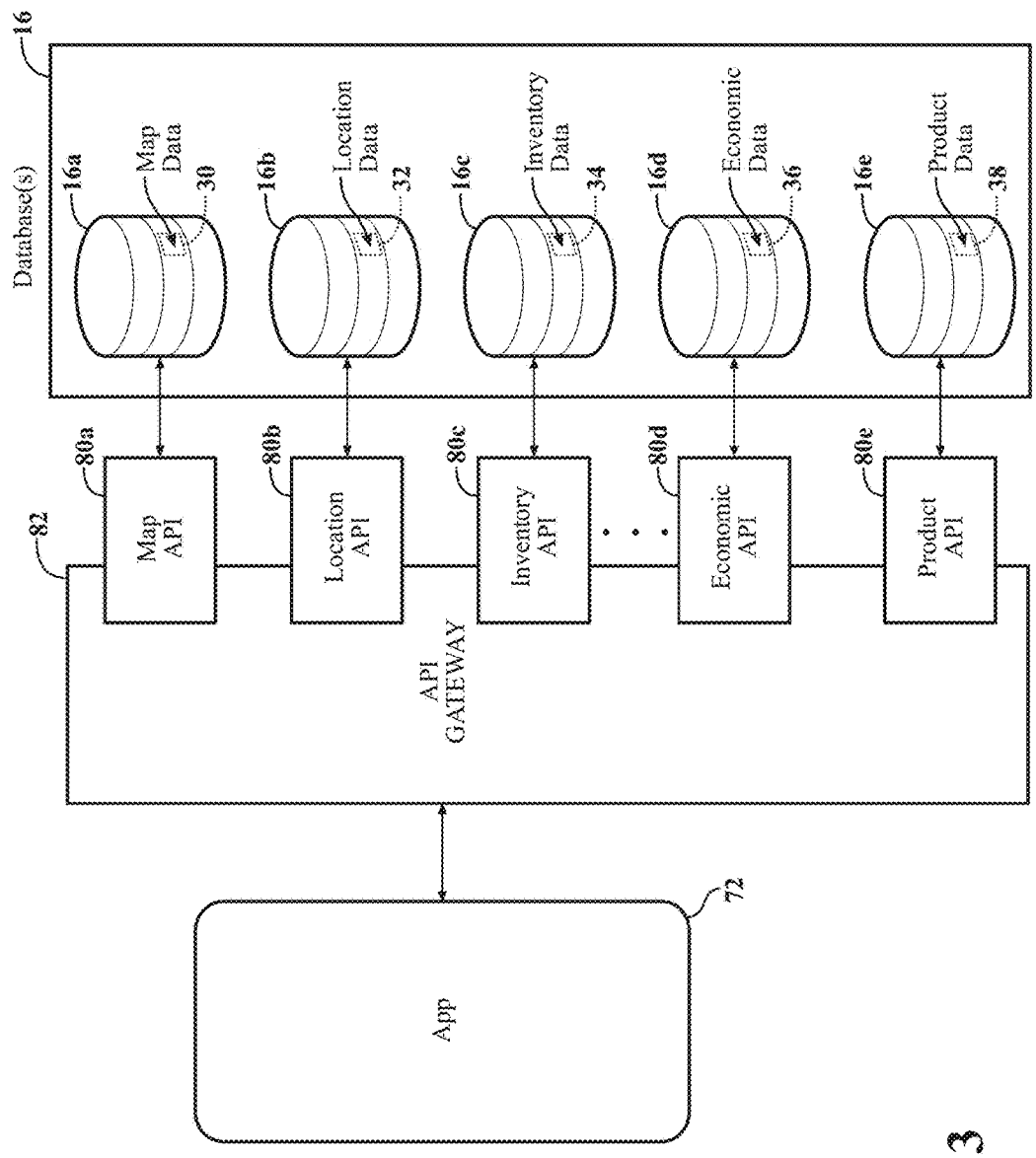
FIG. 3 is a block diagram of components involved with computer-implemented access to various sources of data for facilitating generation of the re-stocking map, according to an embodiment of the present invention.

As shown in FIG. 3, the database(s) 16 are configured to store map data 30 relating to 24 layout of the retail facility. The map data 30 is utilized to generate the map 26 such that the map 26 is presentable on the display 22 of the computing device 12. The database(s) 16 are configured to store location data 32. The location data 32 defines a location of products for sale at the retail facility. The database(s) 16 are further configured to store inventory data 34. The inventory data 34 provides an inventory level of the products for sale at the retail facility. The database(s) 16 are further configured to product data 38. The product data 38 provides an identification, title, description, images, and the like, relating to the products offered for sale at the retail facility.

Figure 4:
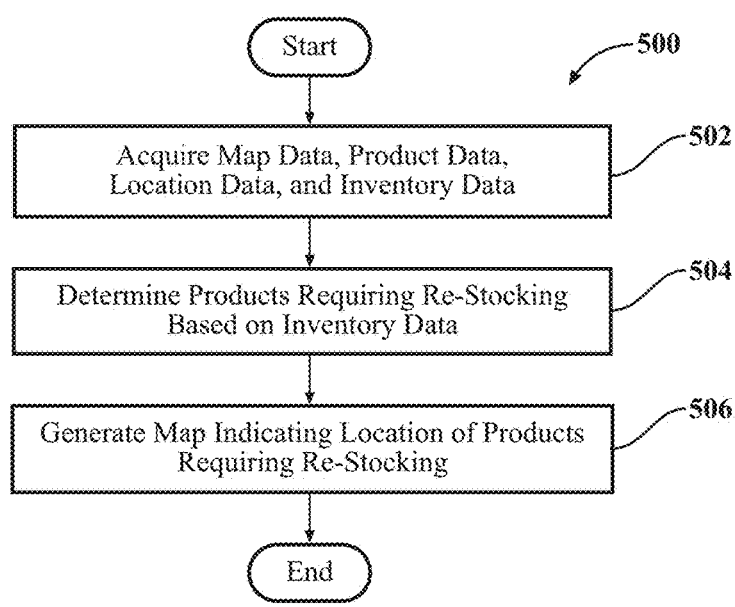
FIG. 4 is a flow diagram of a method for providing presentation of the re-stocking map, according to one embodiment of the present invention.

As shown in FIG. 4, the system 10 implements a computer-implemented method 500. At operation 500, at least one of the processor(s) 14a, 14b is configured to the access the map data 30, location data 32, inventory data 34, and product data 38. The processor 14a from the computing device 30, the processor 14b from the server 20 and/or the search module 15 may access the data 30, 32, 34. The processor(s) 14a, 14b and/or search module 15 access the data 30, 32, 34, 38 in order to read, analyze, and make determinations about the contents of the data 30, 32, 34, 38 in furtherance of generating the map 26. The processor(s) 14a, 14b and/or search module 15 may access the data 30, 32, 34, 38 using any suitable means.

Using at least the inventory data 34, the processor(s) 14a, 14b determines the products requiring re-stocking based on the inventory level, at operation 504. In other words, the processor(s) 14a, 14b reads and analyzes the inventory data 34 to make a determination about what products offered for sale at the facility require replenishment of inventory.

After the determination is made about which products require re-stocking, the processor(s) 14a, 14b, at operation 506, generate for presentation on the display 22 of the computing device 12 the map 26 of the layout 24 of the retail facility. As shown in FIG. 2, the map 26 indicates with respect to the layout 24, at least, the location of the products requiring re-stocking. By indicating the location of the products requiring re-stocking on the map 26, the map 26 provides significant technical assistance to individuals performing re-stocking tasks by taking the manual guesswork out of determining which products need to be replenished. The map 26 digitally, quickly, and clearly identifies what product needs to be re-stocked and where such product is particularly located in the store.

Embodiments in accordance with the present invention may be embodied as a system, server, computer-implemented method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Various aspects and embodiments of the techniques, methods, and components summarized in this section are explained in detail below.

B. Computing Device

Computing device 12 may be a portable device, wherein at least some or all of its components are formed together in a single device, which can be carried around by the individual. The computing device 12 may include any suitable device, including, but not limited to, a portable computer, a laptop or notebook computer, personal desktop assistant (PDA), a tablet, a handheld mobile device including a cellular telephone, Smartphone, Netbook, and the like.

The computing device 12 is utilized within the retail facility. For example, the individual may carry the computing device 12 to facilitate re-stocking of products at the retail store. Alternatively, the computing device 12 may be disposed at a stationary computer station.

Figure 5:
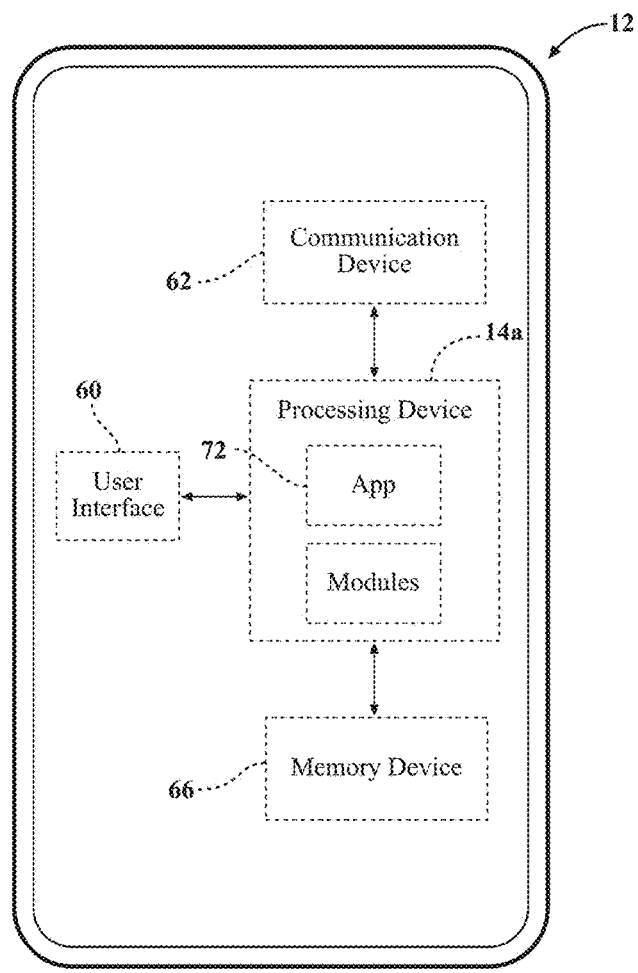
FIG. 5 is a block diagram of components of the computing device of the system, according to an embodiment of the present invention.

FIG. 5 illustrates one embodiment of the computing device 12. The computing device 12 may include a user interface 60, a communication device 62, the processing device 14a (processor), and a memory device 66. Computing device 12 includes any portable electronic device having the processor 14a for executing applications on the user interface 60 displaying information connected with the processor 14a.

On example of the user interface 60 is the aforementioned display 22, which can use any of a variety of types of display technologies, such as a liquid crystal display (LCD), a cathode-ray tube type display, an electronic ink display, a light emitting diode (LED) type display such as an OLED display, a plasma display, or the like.

Computing device 12 may include a graphical user interface (GUI) 68, as shown in FIG. 2, for interactively displaying the map 60. GUI 12 may include a plurality of input objects, which allow the consumer to provide commands to the computing device 12. GUI 68 may include an input to determine the style or settings of the map 26 that the user desires to display on GUI 68. Alternatively, the style and settings of map 26 may be predetermined without any input from the user. GUI 68 may also include input to select the desired retail facility for which the map 26 corresponds. Alternatively, the computing device 12 and/or server 20 may automatically detect the retail facility based on, for example, tracking information related to the location of the computing device 12, or the like.

FIG. 2 illustrates one example of the computing device 12 presenting the map 26 on the display 22. In FIG. 5, the GUI overlays any suitable contextual information relating to the retail facility on the map 26. Such contextual information may include, for example, the location of goods 72, entrances and exits, registers, restrooms, and/or departments (e.g., Dept A), relative to the layout 24 of the facility. Other examples of contextual information include, but are not limited to, position/location, directional or orientation data relating to the computing device 12 in relation to the layout 24. Other contextual information may also include indicators associated with the route taken by the individual through the facility and/or the length of time the computing device 12 was at different locations within the retail facility. Any of the aforementioned contextual information may be presented according to any suitable color, style, shape, and the like. The GUI 68 may overlay any suitable contextual information or data on one the map 26.

In general, the GUI 68 is embodied in a software application ("app") 72 that is run by the computing device 12. The app 72 is any suitable type of software program that facilitates performance of the techniques described herein. The app 72 may be a desktop app, if implemented on a desktop or laptop computers, or a mobile app, if the app 72 is implemented on a mobile device. The app 72 may be pre-installed on the computing device 12 or downloaded to the computing device 12 using the internet. In one embodiment, the app 72 is developed, administered, and provided by the retailer of the facility. The app 72 is utilized using the native components of the computing device 12, such as the user interface 60, the communication device 62, the processor 14a, and the memory device 66. In some embodiments, the app 72 is hosted by the server 20. The app 72 may receive content for presentation to the user on the display 22 of computing device 12, or use such content in other functionality performed by app 72 on computing device 12. Those skilled in the art appreciate that the app 72 may have any suitable configuration without departing from the scope of the invention.

The communication device 62 is in communication with the processor 14a and is capable of sending and receiving information between one or more other computers in communication with the computing device 12. Preferably, the communication device 62 is capable of wirelessly transmitting signals to another computer, such as the server 20 using a radio transmitter and a receiver 63 connected with an antenna. This allows the computing device 12 to be used throughout the facility in mobile implementations.

The computing device 12 is in communication with the server 20 via any suitable network 18. In some embodiments, the computing device 12 may communicate with the server 20 over a cellular data network.

In some embodiments, the communication device 62 communicates with a wireless communications unit such as, e.g., a wireless router or wireless access point that provides a wireless network (wireless network or Wi-Fi). Communication device 62 allows computing device 12 to communicate with another device, e.g., tracking system 18, via the network 18. Communication device 62 can include one or more wireless transceivers for performing wireless communication and/or one or more communication ports for performing wired communication. The communication device 62 allows the computing device 12 to receive/send information or data to facilitate generation of the map 26.

Memory device 66 is a device that stores data generated or received by the computing device 12. Memory device 66 can include, but is not limited to, a hard disc drive, an optical disc drive, and/or a flash memory drive. Memory device 66 may be a file store, memory or some other storage medium configured to store physical components to support the app 72, such as components associated with a graphical user interface, map data, tracking data, and the like. The memory device 66 may include memory, e.g., read only memory (ROM) and random access memory (RAM), storing processor-executable instructions.

The computing device 12 may include any other suitable drives and associated computer readable memory medium to provide storage of computer readable instructions, data structures, program modules and other data for the computing device 12. Drives can include an operating system, application programs, program modules, and program data.

In some embodiments, the processor(s) 14a, 14b, as described herein, include any programmable system including systems and microcontrollers, reduced instruction set circuits (RISC), application specific integrated circuits (ASIC), programmable logic circuits (PLC), and any other circuit or processors capable of executing the functions described herein. The above examples are exemplary only, and thus are not intended to limit in any way the definition and/or meaning of the term processor. In embodiments where there are two or more processors 14a, 14b instead of one, the processors can operate in a parallel or distributed manner.

The computing device 12 further any suitable input devices through which data may enter the computing device 12, either automatically or by a user who enters commands and data. Input devices can include an electronic digitizer, a barcode reader, a microphone, a camera, a video camera, a keyboard and a pointing device, commonly referred to as a mouse, a trackball or a touch pad, a pin pad, any USB device, any Bluetooth enabled device, an RFID or NFC device, and a debit card reader. Other input devices may include a joystick, game pad, scanner, touch screen and the like. In one or more embodiments, input devices are portable devices that can direct display or instantiation of applications running on processor 14a. The computing device 12 may further include any suitable sensors for facilitating tracking of the location, movement, direction or orientation of the computing device 12. Such sensors may include gyro-sensors, accelerometers, or the like. Additionally, processor 14a, 14b may execute any suitable modules for facilitating generation of the map 26.

In one embodiment, as shown in FIG. 3, the computing device 12 is configured to access at least one of the map data 26, location data 30, inventory data 32, and product data 38 using at least one application programming interface (API) 80. The API 80 is a set of routines, protocols, callable methods, or tools specifying how software components should interact. The API 80 may allow embedding of information (e.g., images, video, data) relating to the map data 26, location data 30, and inventory data 32 into the map 26 or other functionality of the app 72. The API 80 may utilize any suitable interface, such as a JavaScript/JSON, XML or Flash interface. The API 80 is configured to accesses any of the database(s) 16 or computer hardware like hard disk drives or video cards. The API 80 is used with GUI 68 and can facilitate integration of features into the app 72, thereby implementing a "plug-in API". The API 80 can also assist with sharing data, which can help to integrate and enhance the functionalities of the app 72. In one embodiment, any of the APIs 80 may be linked to internet-based sources that are operated by the retailer, such as an online retail store, or the like.

The computing device 12 may utilize a plurality of APIs 80. The APIs 80 may be in communication with and/or controlled by the app 72 to facilitate generation of the map 26. The APIs 80 may be stored in the memory device 66 of the computing device 12 and/or on the server 20. The processor 14a of the computing device 12 is configured to execute the APIs 80.

As shown in FIG. 3, each source of data may be accessed by a different one of the APIs 80a-80d. For example, a map API 80a may access the map data 30, a location API 80b may access the location data 32, an inventory API 80c may facilitate access and analysis of the inventory data 34, a product API 80e may access the product data 38, and the like. For example, the product API 80e may return product information shown to a user other than the location and inventory of the product. The product API 80e may retrieve the attributes of the product, including, but not limited to, the title, description, nutrition information, brand name, of the product. The APIs 80a-80e may be implemented, in part, by the app 72 running on the processor 14a of the computing device 12 and/or the processor 14b of the server 20. To manage the APIs 80a-80d, an API management protocol or API orchestration layer, such as an API gateway 82 may be utilized. The API gateway 82 may have any suitable configuration, such as an on-premise proprietary gateway that may be locally installed, a cloud-hosted gateway which re-directs traffic through other servers or data APIs, a plug-in/agent gateway that provides software modules implemented within the application 72, open source gateways, or the like.

Those skilled in the art appreciate that the computing device 12 may have various other configurations not specifically described herein for implementing any of the techniques described herein. Additionally, the API(s) 80 and/or gateway 82 may have other configurations not specially recited herein without departing from the scope of the invention.

C. Server and Database(s)

Various embodiments, components, and techniques related to the server 20 and database(s) 16 are described herein. The system 10 may include the server 20 to facilitate generation of the map 26. In one embodiment, the server 20 is operated by the retailer. Alternatively, the server 20 may be operated by a third party on behalf of, or employed by, the retailer. The server 20 may be physically located at the retail facility. Alternatively, the server 20 may be physically located at a site that is remote from the retail facility.

Figure 6:
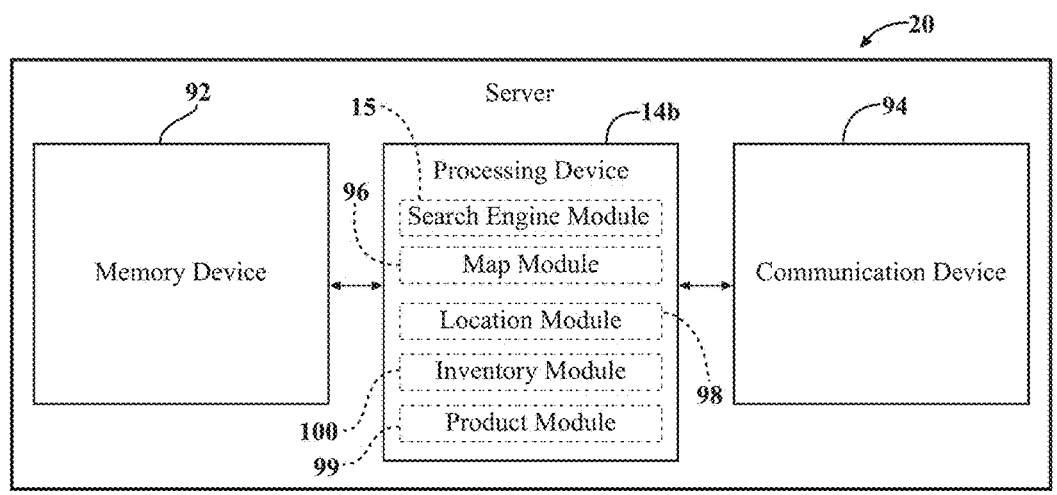
FIG. 6 is a block diagram of a server of the system, according to an embodiment of the present invention.

With reference to FIG. 6, the server 20, according to one embodiment, comprises the processing device 14b, which can communicate with a memory device 92 and a communication device 94 in the server 20.

The server processing device 14b can include memory, e.g., read only memory (ROM) and random access memory (RAM), storing processor-executable instructions and one or more processors that execute the processor-executable instructions. In embodiments where the server processing device 14b includes two or more processors, the processors can operate in a parallel or distributed manner. The server processing device 14b, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor. In an example, the server processing device 14b may host the app 72 provided on the computing device 12.

The server communication device 94 allows the server 20 to communicate with another device, e.g., the computing device 12, and the like, via the network 18. The server communication device 94 can include one or more network interfaces and/or wireless transceivers for performing wireless communication and/or one or more communication ports for performing wired communication. The map data 30, location data 32, inventory data 34, and/or product data 38 may be transmitted or received with the communication device 94.

The server memory device 92 stores data generated or received by the server 20. For example, the server memory device 92 may store any one the map data 30, location data 32, inventory data 34, and/or product data 38. The server memory device 92 can include, but is not limited to a hard disc drive, an optical disc drive, and/or a flash memory drive. Further, the server memory device 92 may be distributed and located at multiple locations. The server memory device 92 is accessible to the processing device 14b. In some embodiments, the server memory device 92 stores the data in the database(s) 16.

The server 20 may include any suitable modules for retrieving and processing the data. For example, the server 20 may include a map module 96 configured to obtain maps corresponding to the layout 24 of any one of a plurality of retail facilities. Map module 96 may receive the layout 24 from a plurality of sources such as the retail facility itself, a partner of a retail facility, the internet, a blueprint, a database of WKT (well known text) objects, or any other source of map information. In some embodiments, map module 96 generates maps that include the layout 24 of the desired retail facility including product placement indicators, size of different departments, and/or aisles of the retail facility. Map module 96 may also be configured to receive map data 30 comprising only have a limited layout 24 of the retail store including the positioning of the walls of the retail store.

Map module 96 may be configured to enable presentation of map data 30 associated with the retail facility on GUI 68. Map module 96 may query the map database 16 using tracking data associated with the computing device 12, e.g., RTLS coordinates, or a general location, e.g., postal zip code or city/state, and automatically determine the retail facility where computing device 12 is located and the corresponding layout 24 of the retail facility. Map module 96 may be configured to overlay the contextual information on the layout 24.

The processing device 14b in the server 20 may additionally implement a location module 98, a product module 99, and an inventory module 100. The location module 98 may access and analyze the location data 32 to determine the location of the products requiring re-stocking. The product module 99 may access and analyze the product data 38 to determine the identity attributes of the products requiring re-stocking. The inventory module 100 may access and analyze the inventory data 34 to determine which products require re-stocking. Any of the modules 96, 98, 99, 100 may work in conjunction with one another collectively to make the determinations of the techniques described herein. The modules 96, 98, 99 100 in the server 20 are optional and may not be necessary in view of the API architecture described above relating to the computing device 12. In other words, the computing device 12 may make such determinations independent of the server 20. Furthermore, in some embodiments, the search engine module 15 may replace any one or all of the modules 96, 98, 99 100.

Any of the database(s) 16 may be operated by the retailer. Alternatively, the database(s) 16 may be operated by a third party on behalf of, or employed by, the retailer. The database(s) 16 may be physically located at the retail facility. Alternatively, the database(s) 16 may be physically located at a site that is remote from the retail facility.

The database(s) 16 may store any of map data 30, location data 32, inventory data 34, and product data 38. In one embodiment, as shown in FIG. 3, the system 10 comprises a plurality of databases 16a-16e. Each source of data is stored in a separate database 16a-16e. That is, the map data 30 is stored in a database 16a dedicated to the map data 30, the location data 32 is stored in a database 16b dedicated to the location data 32, the inventory data 34 is stored in a database 16c dedicated to the inventory data 34, and the product data 38 is stored in a database 16e dedicated to the product data 38. Additionally, each API 80a-80e can communicate directly with the database(s) 16a-16d to access the respective data from that database 16.

The database(s) 16 can additionally store information associated with any individual or computing device 12. For example, the database(s) 16 can store information associated with a user account and may include account preferences and user contact information. The database 16 may be queried by the processor(s) 14a, 14b and may provide information to the processor(s) 14a, 14b to facilitate generation of the map 26.

The map data 30 stored in the database(s) 16a comprises data relating to 24 layout of the retail facility. As used herein, the term "map data" refers to map information defining the layout 24 of the retail facility or information otherwise relating generally to the layout 24. For example, the map data 30 may define any of the structures, areas, and objects relating to the layout 24. The map data 30 is utilized to generate the map 26 such that the map 26 is presentable on the display 22 of the computing device 12. One embodiment of the map 26, as displayed in FIG. 2, comprises boundaries for aisles, walls, and departments. The map data 30 may be generated and/or provided by the retailer or a source relating to the retailer. Those skilled in the art appreciate that the map 26 may be displayed according to any suitable configuration. For example, the map 26 may comprise a grid reference system, a Cartesian coordinate system with geospatial reference points, any suitable 2-D or 3-D virtual or real images, and the like. The map data 30 may comprise other information not specifically described herein.

The location data 32 stored in the database(s) 16b defines the location of products at the facility. For example, the location data 32 may define a general location (e.g., Department A), and/or a precise location (e.g., aisle 7, bin 8) where the retailer has decided to place the product for sale. The location data 32 may additionally define the identity of the product, e.g., using an item name/number, identification codes, UPC codes, as well as other information associated with the products or the like. The location data 32 is utilized to identify the location of products requiring re-stocking on the map 26 of the layout 24. The location data 32 may be generated and/or provided by the retailer or a source relating to the retailer. The location data 32 may comprise other information not specifically described herein. In some embodiments, the product data 38 may be incorporated into the location data 32.

The inventory data 34 stored in the database(s) 16*c* may comprise information associated the inventory level of products offered for sale at the retail facility. For example, the inventory data 34 may define what the product is, and how many units of the product are available within the shopping area of the facility for consumers to purchase, and how many of those units were sold. In one instance, the inventory data 34 defines that 50 units of item 1231—Milk, brand X, type Y, were placed in the store refrigerator as of 12:00 AM. The inventory data 34 also indicates that 39 units of item 1231—Milk, brand X, type Y were sold up to a specified time.

The inventory data 34 may be generated and/or provided by the retailer or a source relating to the retailer. Ideally, the inventory data 34 is maintained or updated in real-time to maximize accuracy of the map 26 and to maximize re-stocking efficiency based on the map 26. That is, once products are sold, the inventory data 34 may be immediately updated to reflect the loss of units offered for sale. Conversely, once products are re-stocked, the inventory data 34 may be immediately updated to reflect the addition of units offered for sale. Such updating may be based on input from sales systems at the retail facility or the computing device(s) 12. For example, such sales systems may send data from e-receipts to the server 20 such that the information from the products purchased on the e-receipts may be digitally extracted and inputted into the inventory data 34. The inventory data 34 may comprise other information not specifically described herein. In some embodiments, the product data 38 may be incorporated into the inventory data 34.

From here, determinations can be made, either within the database(s) 16 or by the processor(s) 14*a*, 14*b* about what the inventory level is by computing the difference between the units placed in the store and the units sold.

Ideally, to maximize sales, the inventory of products offered for sale should be replenished anytime a product is sold. However, such an approach may not be practical. Instead, the determination about which products require re-stocking may be made using a predefined threshold value. For example, if any product has an inventory level that is currently less than 20% of the total units previously placed for sale, the processor(s) 14*a*, 14*b* determines that the inventory level is too low, and thereafter, determines that this particular product is one that requires re-stocking. In other words, in this example, 80% of the units placed on the shelf were sold, leaving less than 20% of the units remaining. The predefined threshold value may be any other suitable value and be based on any suitable other inventory metric not specially recited herein.

In some embodiments, any of the processor(s) 14*a*, 14*b* are further configured to determine a change in the quantity of the products available for sale at the retail facility over time (also known as the sell rate) based on the inventory level. Knowing the change in the quantity over time may help to determine trends or patterns in sales, and the like. This allows predictions to be made about what products will need re-stocking before the inventory levels on such products reach low or empty levels.

In some embodiments, the database(s) 16, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

D. Network

Various embodiments, components, and techniques related to the network 18 are described herein. The network 18 may include one or a plurality of networks 18 for facilitating communication between any one of the computing device 12, server 20, and tracking system 18. It will be understood that network 18 may be a combination of multiple different kinds of wired or wireless networks.

Network 18 may include any type of network that is capable of sending and receiving communication signals, including signals for multimedia content, images, data and streaming video. Network 18 may include a data network, such as the Internet, an intranet, a local area network (LAN), a wide area network (WAN), a cable network, and other like systems that are capable of transmitting information, such as digital data, and the like. Network 18 may also include a telecommunications network, such as a local telephone network, long distance telephone network, cellular telephone network, satellite communications network, and other like communications systems that interact with computer systems to enable transmission of information. Network 18 may include a plurality of data networks, a plurality of telecommunications networks, cable systems, satellite systems and/or a combination of data and telecommunications networks and other like communication systems.

The network 18 or any portion thereof may be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Those skilled in the art appreciate that various other network 18 configurations, not specifically recited herein, are possible.

E. Mapping Techniques

As described herein, any of the processor(s) 14*a*, 14*b* are configured to access the map data 30, location data 32, inventory data 34, and product data 38 and determine the products requiring re-stocking based on the inventory level. The processor(s) 14*a*, 14*b* then generates for presentation on the display 22 of the computing device 12 the map 26 of the layout 24 of the retail facility wherein the map 26 indicates with respect to the layout 24 the location of the products requiring re-stocking.

Figure 7:
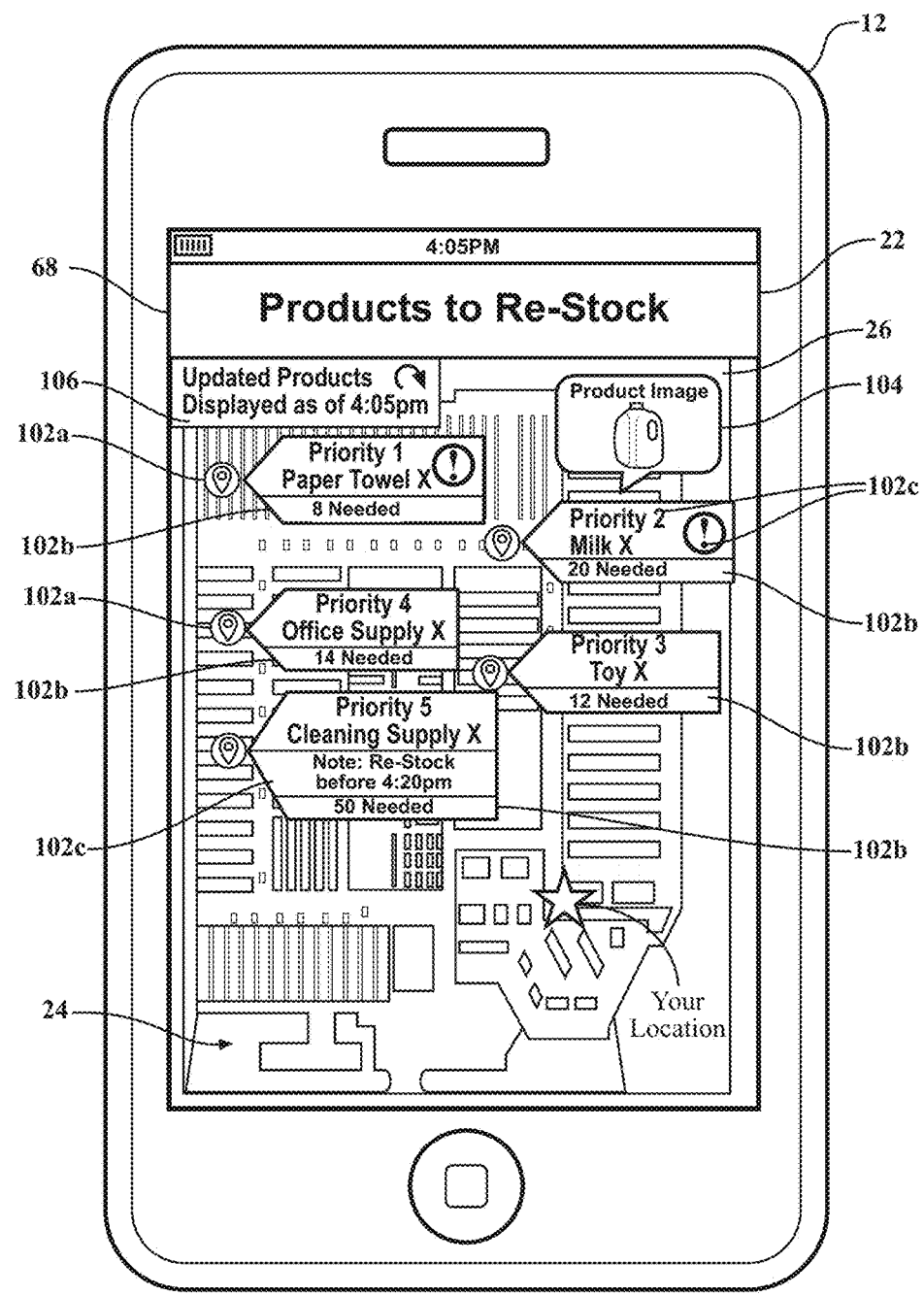
FIG. 7 is a sample screenshot of the display of the computing device presenting the re-stocking map further having re-stocking priority graphics overlaid thereon, according to an embodiment of the present invention.

Examples of the map 26 displayed on the computing device 12 are provided in FIGS. 2 and 7. The map 26 comprises the layout 24 of the facility, in part or in whole. When provided in whole, the map 26 provides an overview of the whole retail facility. The layout 24 in the map 26 need not provide all information relating to the structures, areas, and objects at the facility. Any appropriate information may be omitted from the layout 24 for suitable reasons, such as confidentiality, safety, redundancy, or efficiency. As such, the map 26 need not include every detail of the layout 24. Rather, the map 26 is provided to give the user of the computing device 12 context as to where the user is generally located at the retail facility such that identifying the location of the products requiring re-stocking can be easily performed.

The map 26 may have variable zoom such that the user of the computing device 12 can zoom the map 26 in or out. The GUI 68 may provide a zoom interface for allowing the user to specify the zoom level of the map 26. The map 26 may have any suitable resolution for facilitating identification of the products.

In one embodiment, the map 26 is configured such that the entirety of the layout 24 presented in the map 26 is static. That is, the map 26 remains in a constant state and neither zooms-in, rotates, etc. In other embodiments, the map 26 is dynamic and is configured such that the layout 24 changes dependent on changes in the location of the computing device 12. That is, as the computing device 12 moves throughout the retail facility, the map 26 may follow the location and/or orientation of the computing device 12. For instance, the map 26 may be configured to automatically center based on the current location of the computing device 12. Additionally, the map 26 may be configured to automatically rotate the layout 24 presented based on the orientation or direction of the computing device 12, which is representative of the direction that the individual is standing at the facility.

The map 26 is generated, in part, based on the map data 30, location data 32, and inventory data 34. The map data 30 is utilized to generate the layout 24 of the map 26 for the specific retail facility. The inventory data 34 is utilized to identify products requiring re-stocking on the map 26 and display inventory levels relating to the identified products on the map 26. The location data 32 is utilized to pinpoint the location of the products requiring re-stocking on the map 26. In some embodiments, the map 26 may use some of, but not all of the sources of data 30, 32, 34. In other embodiments, the map 26 uses all of the sources of data 30, 32, 34.

The map 26 is configured such that graphics 102 are overlaid thereon. The map 26 displays graphics 102 relating to products in the retail facility. For example, as shown in FIG. 2, the map 26 displays location graphic 102*a*, which denotes the location of the product requiring re-stocking at the facility. Any of the processor(s) 14*a*, 14*b* are configured to generate the location graphic 102*a* and overlay the location graphic 102*a* at the location of the products on the map 26. In one example, the location graphic 102*a* is denoted by a pin-drop. In FIG. 2, the location graphic 102*a* for each product is placed at specific aisles and location within the aisle where the respective product is placed for sale.

The location graphic 102*a* may indicate other location information about the product, including, but not limited to, notes about where exactly the product is located. The location graphic 102*a* may indicate what side of the aisle, what shelf or bin the product, and/or any other information about where the product should be placed. Such information can be denoted by the location graphic 102*a* using visual or textual graphics. The location graphic 102*a* can be represented in geographic coordinates, Cartesian coordinates, e.g., an (x, y) point if the facility is divided into a Cartesian plane, a combination of coordinate system or reference points within other coordinate systems, or the like. A series of reference points allow mapping from one coordinate system, e.g., Cartesian, to another coordinate system, e.g. geographical, and the like. Those skilled in the art appreciate that the location of the product may be denoted by other graphics not specifically recited herein and that the location graphic 102*a* may indicate other location information about the product not specifically recited herein.

Another graphic that can be overlaid on the map 26 is an inventory graphic 102*b*, which indicates inventory information about the products identified as requiring re-stocking. As shown in FIG. 2, the inventory graphic 102*b* according to one example comprises a text box that is linked to the location graphic 102*a* of the product. The text box identifies the identity of the product and the inventory level of the product. In FIG. 2, the item is identified using a product number and the inventory level is identified using a predetermined level. For example, those products that are completely out of stock on the shelves may have the inventory graphic 102*b* identify out of stock" whereas those products that are have limited amount of stock on the shelves may have the inventory graphic 102*b* identify "limited stock." Inventory graphic 102*b* may also indicate additional information about the inventory level of the product. As shown in FIG. 7, the inventory graphic 102*b* indicates a quantity of how many units of the product are needed to be placed in the retail area for sale to replenish stock. For example, as shown in FIG. 7, the inventory graphic 102*b* indicates that 8 units of paper towel brand X are needed to re-stock. The quantity needed to re-stock can be determined by the processor(s) 14*a*, 14*b* using inventory data 34 to compare how many units have been placed on the shelves to how many units have been sold.

In yet another example, the processor(s) 14*a*, 14*b* generate at least one inventory graphic 102*b* based on the change in the quantity of the products over time. Such inventory graphic 102*b* may have any suitable form, such as a chart, graph, heat map or the like. The change in the quantity of the products available for sale over time derived from the inventory data 34 may also be used to modify or add text or suggestions to the inventory graphic 102*b* relating sale of the product to time. For example, as shown in FIG. 7 the inventory graphic 102*b* may indicate that "product rapidly being sold, "product predicted to sell out in 5 minutes," or "product should be re-stocked before 4:20 PM," or the like.

The inventory graphic 102*b* may indicate other inventory information about the product, including, but not limited to, notes about how the product should be re-stocked, and the like. For example, the inventory graphic 102*b* may indicate a presentation configuration of the product so that re-stocking employees know how to arrange the product for display, e.g., the product should be stocked with the brand name facing consumers, etc. Such information can be denoted by the inventory graphic 102*b* using visual or textual graphics.

In yet another example, as shown in FIG. 7, the inventory graphic 102*b* may additionally provide a product pop-up 104 that comprises an image or video to assist the individual re-stocking the product with identifying what the product looks like, how the product should be stocked, or any other suitable inventory or stocking information. The pop-up 104 may be selectively accessible via any suitable technique, such as clicking on any of the graphics 102, or the like. The product images or videos may be stored in the database(s) and the clicking on the graphic 102 may open a hyperlink to the pop-up 104. In at least this way, the map 26 can also be interactive allowing the user to access layers of map data 30, location data 32, inventory data 34, and/or product data 38 hidden initially from the displayed map 26. Those skilled in the art appreciate that the inventory information of the product may be denoted by other graphics not specifically recited herein and that the inventory graphic 102b may indicate other information about the product not specifically recited herein. Additionally or alternatively, the product pop-up 104 may be based on the product data 38 independent of the inventory data 34

Those skilled in the art appreciate that other objects, items, or features of the retail facility may be represented by overlaying graphics 102. Additionally, any of the graphics 102 described herein may have other suitable shapes, forms, styles, colors, and the like, without departing from the scope of the invention. For instance, graphics 102 may be animated or static. In addition, the graphics 102 may be overlaid according to any suitable method, including, but not limited to layering, image overlay, video overlay, or the like.

i. Economic Data and Re-Stocking Priority

Figure 8:
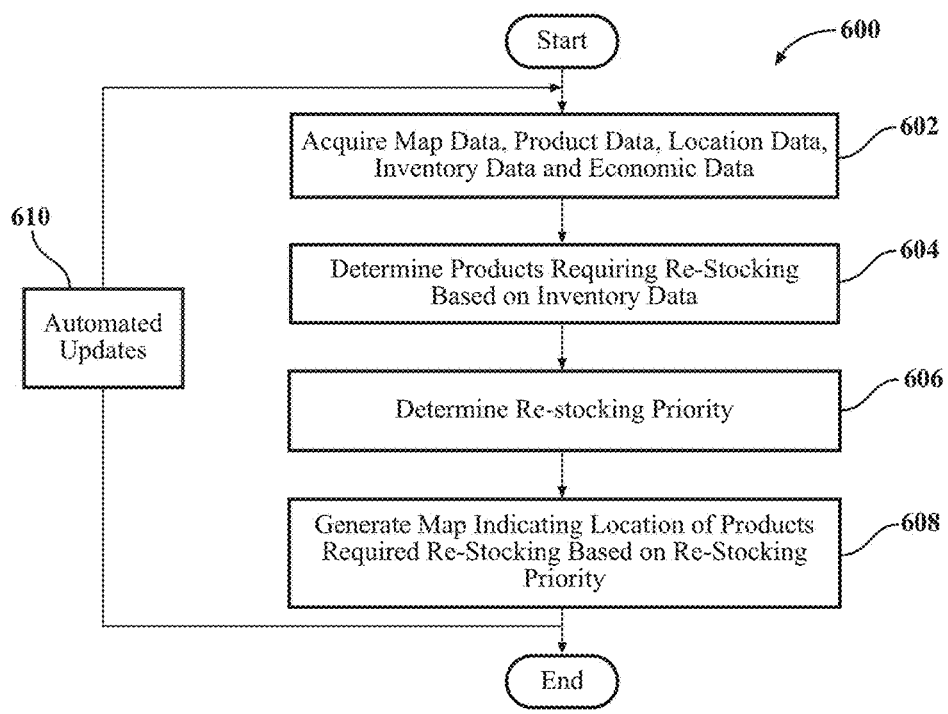
FIG. 8 is a flow diagram of a method for providing presentation of the re-stocking map with the re-stocking priority, according to an embodiment of the present invention.

FIG. 8 illustrates an embodiment of the computer-implemented method 600 wherein a re-stocking priority can be determined to accompany the aforementioned functionality and features of the map 26.

At operation 600, at least one of the processor(s) 14a, 14b and/or search module 15 are configured to the access the map data 30, location data 32, inventory data 34, and product data 38. In this embodiment, however, the processor(s) 14a, 14b may further access economic data 36. The economic data 36 relates economic metrics, parameters, or measures relating to the sale of the products. For example, the economic data 36 may relate to at least one of profitability, turnover, and return on investment (ROI) of the products for sale at the retail facility. Profitability of the product is the difference between the cost of the product unit and the revenue generated by the sale of the product unit. Turnover is the volume of sales of the product, which may be measured over time. Return on investment or gain from investment is the return or gain from the sale of the product unit divided by the cost of the product unit with the result expressed as a percentage or a ratio. Those skilled in the art appreciate that the economic data 36 may comprise any other appropriate economic or financial metric relating to the sale of the product.

Furthermore, any of the described techniques described herein relating to storing, accessing, processing, and/or analyzing the map data 30, location data 32, inventory data 34, or product data 38 may be utilized equally in part, or in whole, for the economic data 36. For example, as shown in FIG. 3, there may be an economic API 80d that is configured to access the economic data 36. Additionally, the economic data 36 may be stored in a dedicated database 16d or may be stored in any of the other databases 16a-16e.

Using at least the inventory data 34, the processor(s) 14a, 14b determines the products requiring re-stocking based on the inventory level, at operation 604, as described above. After the determination is made about which products require re-stocking, the processor(s) 14a, 14b, at operation 606, determines the re-stocking priority. The re-stocking priority is a determination about what products, among those requiring re-stocking, are regarded or treated as more important/urgent. Alternatively or additionally, the re-stocking priority may be a determination about what products, among those requiring re-stocking, are regarded or treated as less important/urgent. Any of the processor(s) 14a, 14b are configured to determine the re-stocking priority based on the economic data 36. Thus, the processor(s) 14a, 14b may rank the products requiring re-stocking based which products are most profitable, which products have the highest turnover, and/or which products provide the greatest ROI, and the like. In this way, the re-stocking priority optimizes sales by promoting or instructing replenishment products that are more likely to be sold first or generate more income/profit for the retailer.

Re-stocking priority may additionally be based on a combination of location data 32, inventory data 34, and economic data 36. For example, a product requiring re-stocking may have high ROI based on the economic data 36, but the product inventory may not be particularly low based on the inventory data 34, or the product maybe located in a "hot-spot" of the store where customer traffic is high. The re-stocking priority may use a predictive algorithm to assign a calculated weight to each of the location data 32, inventory data 34, and economic data 36 factors to determine the priority.

At operation 608, the map 26 is generated to indicate the re-stocking priority in addition to the location of the products as described above. For example, as shown in FIG. 7, any of the processor(s) 14a, 14b are configured to generate at least one priority graphic 102c indicating the determined re-stocking priority of the products requiring re-stocking and overlay the priority graphics 102c on the map 26. As shown in FIG. 7, the priority graphic 102c according to one example comprises a text box that is linked to the location graphic 102a of the product. The text box identifies the re-stocking priority of the product at that location. In FIG. 7, the priority for the five illustrated products is identified using a rank system where "Priority 1" is the highest priority product and "Priority 5" is the lowest priority product. Priority graphic 102c may also indicate additional information about the re-stocking priority of the product. The priority graphic 102c may further comprise other visuals denoting the priority. For example, as shown in FIG. 7, an 'exclamation mark" may be shown next to the highest priority product(s). Other suitable visuals denoting priority may include flags, colors, animations, and the like.

ii. Updates

Because re-stocking of products is a continuous process, any processor(s) 14a, 14b are further configured to provide, at operation 610 automated updates about which products requiring re-stocking and to provide automated updates to the map 26 to indicate updated locations of the products requiring re-stocking.

When products are re-stocked in accordance with the techniques described herein, the inventory data 34 is updated to reflect the re-stocking. The inventory data 34 maybe updated automatically based on electronic sales data. Alternatively, the inventory data 34 maybe updated based on manual input from the computing device 12. For example, the individual in charge of re-stocking the product may "check-off" or otherwise indicate to the GUI 68 that the product has been successfully re-stocked. The computing device 12 may register a timestamp based on the moment of re-stocking completion and/or a quantity of units re-stocked. This information can be communicated back to the server 20 for automated updating of the inventory data 34.

Thereafter, the processor(s) 14a, 14b may continuously or periodically access the map data 30, location data 32 inventory data 34, and product data 38 to re-determine which products require re-stocking. For example, product A may have inventory that rises above the predefined threshold value because of re-stocking efforts. However, product B may coincidentally have inventory that has just fallen below the predefined threshold value. In such instances, the inventory data 34 is updated to reflect latest inventory levels of products A and B. The processor(s) 14a, 14b determines, based on the inventory data 34, that product A does not currently require re-stocking while product B required re-stocking. Accordingly, the at least one of the processor(s) 14a, 14b are configured to update the map 26 to remove/hide the graphics 102 about product A on the map 26, and instead provide any of the aforementioned graphics 102 about product B on the map 26. Updates may be instantaneously, or at predetermined intervals, e.g., every second, every minute, every five minutes, etc. Additionally, as shown in FIG. 7, the GUI 68 may provide update notifications 106 indicating update information, such as when pervious updates were performed, when subsequent updates will occur, and the like.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

In the preceding description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

A computing device, server or computer, such as described herein, includes at least one or more processors or processing units and a system memory (see above). Any of the aforementioned devices may include form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific examples are provided for explanation purposes and that other techniques may also be employed in other embodiments and examples in accordance with the teachings of the present disclosure.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system, comprising:
   at least one database comprising:
      map data relating to a layout of a retail facility;
      product data identifying products for sale at the retail facility;
      location data defining locations of the products for sale at the retail facility; and
      inventory data providing an inventory level of the products for sale at the retail facility; and
   a processor configured to:
      access the map data, the product data, the location data, and the inventory data;
      determine first products of the products that require re-stocking, based on the inventory level;
      generate for presentation on a display of a computing device a graphical user interface comprising a map of the layout of the retail facility, wherein the map indicates at least one location of the first products requiring re-stocking with respect to the layout of the retail facility, and wherein the locations comprise the at least one location;
      automatically rotate, based on an orientation of the computing device, the map of the layout of the retail facility displayed on the graphical user interface of the computing device;
      dynamically track and display a device location of the computing device on the map of the graphical user interface as the computing device moves throughout the retail facility;
      generate at least one location graphic indicating the at least one location of the first products requiring re-stocking and at least one quantity change graphic based on a change in at least one quantity of the first products available for sale at the retail facility over time; and
      overlay the at least one location graphic at the at least one location of the first products requiring re-stocking on the map and the at least one quantity change graphic on the map.

2. The system of claim 1, wherein the graphical user interface of the computing device further comprises:
   a zoom interface that specifies a zoom level of the map of the layout of the retail facility.

3. The system of claim 1, wherein the at least one database further comprises economic data relating to at least one of profitability, turnover, or return on investment (ROI) of the products for sale at the retail facility.

4. The system of claim 3, wherein the processor is further configured to determine a re-stocking priority based on at least one of the inventory data, the location data, or the economic data.

5. The system of claim 4, wherein the processor is further configured to:
   generate at least one priority graphic indicating the re-stocking priority of the first products requiring re-stocking; and
   overlay the at least one priority graphic on the map.

6. The system of claim 1, wherein the processor is further configured to:
   provide automated updates about the first products requiring re-stocking; and
   update the map presented on the display of the computing device to indicate updated locations of the first products requiring re-stocking based on the automated updates.

7. The system of claim 1, wherein the processor is further configured to access at least one of the map data, the product data, the location data, or the inventory data using at least one application programming interface (API).

8. The system of claim 1, wherein the inventory level further comprises the at least one quantity of the first products available for sale at the retail facility in real-time.

9. The system of claim 8, wherein the processor is further configured to determine the change in the at least one quantity of the first products available for sale at the retail facility over time based on the inventory level.

10. The system of claim 9, wherein:
    the at least one quantity change graphic further comprises a chart, a graph, or a heat map.

11. The system of claim 1, wherein the computing device is a mobile device utilized by an individual who performs re-stocking at the retail facility.

12. A computer-implemented method comprising:
    accessing from at least one database:
       map data relating to a layout of a retail facility;
       product data identifying products for sale at the retail facility;
       location data defining locations of the products for sale at the retail facility; and
       inventory data providing an inventory level of the products for sale at the retail facility;
    determining, with a processor, first products of the products that require re-stocking, based on the inventory level;
    generating, with the processor, for presentation on a display of a computing device a graphical user interface comprising a map of the layout of the retail facility, wherein the map indicates at least one location of the first products requiring re-stocking with respect to the layout of the retail facility, and wherein the locations comprise the at least one location;
    automatically rotate, based on an orientation of the computing device, the map of the layout of the retail facility displayed on the graphical user interface of the computing device;
    dynamically tracking and displaying a device location of the computing device on the map of the graphical user interface as the computing device moves throughout the retail facility;
    generating at least one location graphic indicating the at least one location of the first products requiring re-stocking and at least one quantity change graphic based on a change in at least one quantity of the first products available for sale at the retail facility over time; and
    overlaying the at least one location graphic at the at least one location of the first products requiring re-stocking on the map and the at least one quantity change graphic on the map.

13. The computer-implemented method of claim 12, wherein the graphical user interface of the computing device further comprises:
    a zoom interface that specifies a zoom level of the map of the layout of the retail facility.

14. The computer-implemented method of claim 12, further comprising:
    accessing-from the at least one database economic data relating to at least one of profitability, turnover, or return on investment (ROI) of the products for sale at the retail facility.

15. The computer-implemented method of claim 14, further comprising:
   determining, with the processor, a re-stocking priority based on at least one of the inventory data, the location data, or the economic data.

16. The computer-implemented method of claim 15, further comprising:
   generating, with the processor, at least one priority graphic indicating the re-stocking priority of the first products requiring re-stocking; and
   overlaying, with the processor, the at least one priority graphic on the map.

17. The computer-implemented method of claim 12, further comprising:
   providing, with the processor, automated updates about the first products requiring re-stocking; and
   updating, with the processor, the map presented on the display of the computing device to indicate updated locations of the first products requiring re-stocking based on the automated updates.

18. The computer-implemented method of claim 12, wherein accessing, with the processor, from the at least one database is further defined as accessing at least one of the map data, the product data, the location data, or the inventory data using at least one application programming interface (API).

19. The computer-implemented method of claim 12, wherein the inventory level comprises the at least one quantity of the first products available for sale at the retail facility in real-time and further comprising:
   determining, with the processor, the change in the at least one quantity of the first products available for sale at the retail facility over time based on the inventory level; and
   generating, with the processor, the at least one quantity change graphic further comprises a chart, a graph, or a heat map.

20. One or more non-transitory computer-readable storage media storing computer-executable instructions, wherein when executed by at least one processor, the computer-executable instructions cause the processor to:
   access from at least one database:
      map data relating to a layout of a retail facility;
      product data identifying products for sale at the retail facility;
      location data defining locations of the products for sale at the retail facility; and
      inventory data providing an inventory level of the products for sale at the retail facility;
   determine first products of the products that require re-stocking, based on the inventory level;
   generate for presentation on a display of a computing device a graphical user interface comprising a map of the layout of the retail facility, wherein the map indicates at least one location of the first products requiring re-stocking with respect to the layout of the retail facility, and wherein the locations comprise the at least one location;
   automatically rotate, based on an orientation of the computing device, the map of the layout of the retail facility displayed on the graphical user interface of the computing device;
   dynamically track and display a device location of the computing device on the map of the graphical user interface as the computing device moves throughout the retail facility;
   generate at least one location graphic indicating the at least one location of the first products requiring re-stocking and at least one quantity change graphic based on a change in at least one quantity of the first products available for sale at the retail facility over time; and
   overlay the at least one location graphic at the at least one location of the first products requiring re-stocking on the map and the at least one quantity change graphic on the map.

* * * * *